United States Patent [19]
Veitch et al.

[11] Patent Number: 5,153,022
[45] Date of Patent: Oct. 6, 1992

[54] STOCHASTIC ORIENTATION OF MAGNETIC RECORDING MEDIA

[75] Inventors: Ronald J. Veitch, Maxdorf; Gerhard Soehring, Weinheim; Helmut Jakusch, Frankenthal; Volker Koch, Battenberg, all of Fed. Rep. of Germany

[73] Assignee: BASF Aktiengesellschaft, Ludwigshafen, Fed. Rep. of Germany

[21] Appl. No.: 772,901

[22] Filed: Oct. 8, 1991

[30] Foreign Application Priority Data

Oct. 10, 1990 [DE] Fed. Rep. of Germany ....... 4032129

[51] Int. Cl.⁵ .............................................. B05D 3/14
[52] U.S. Cl. .................................. 427/599; 427/128; 427/130
[58] Field of Search ............. 427/48, 128–132; 428/694, 695, 900

[56] References Cited

U.S. PATENT DOCUMENTS

| | | | |
|---|---|---|---|
| 4,208,447 | 6/1980 | Bate et al. | 427/48 |
| 4,338,642 | 7/1982 | Clark et al. | 360/97 |
| 4,518,627 | 5/1985 | Foley et al. | 427/48 |
| 4,652,461 | 3/1987 | Kato et al. | 427/48 |
| 4,791,032 | 12/1988 | Komatsu et al. | 427/128 |

OTHER PUBLICATIONS

Patent Abstracts of Jpn., vol. 12, No. 243 (Jul. 9, 1988) citing Jpn. Kokai 63-34730.
Patent Abstracts of Jpn., vol. 14, No. 35 (Jan. 23, 1990) citing Jpn. Kokai 1-271917.
Patent Abstracts of Jpn., vol. 9, No. 265 (Oct. 23, 1985) citing Jpn. Kokai 60-113329.
Patent Abstracts of Jpn., vol. 13, No. 440 (Oct. 4, 1989) citing Jpn. Kokai 1-169725.

*Primary Examiner*—Bernard Pianalto
*Attorney, Agent, or Firm*—Keil & Weinkauf

[57] ABSTRACT

A process for the production of magnetic recording media having stochastic orientation of the magnetic anisotropic particles in the magnetic layer with the aid of a magnetic drum rotating above the still fluid dispersion layer and containing radially arranged permanent magnets of alternating polarity, and a corresponding apparatus for carrying out the process.

4 Claims, 2 Drawing Sheets

STOCHASTIC ORIENTATION OF MAGNETIC RECORDING MEDIA

The present invention relates to a process for production of magnetic recording media having stochastic orientation of the magnetic anisotropic particles in the magnetic layer and an apparatus for carrying out the process.

For the production of layer-like magnetic recording media, magnetically anisotropic particles, dispersed in a binder system, are applied in the form of this dispersion to a substrate and the binder is solidified. These known processes generally involve uniaxial orientation of the magnetically anisotropic particles with the aid of an appropriate external magnetic field parallel to the recording direction predetermined during use of the recording medium. The elimination of the residual induction which can thus be achieved improves the recording properties in the recording direction, which is usually the longitudinal direction.

As a result of many novel recording methods deviating from the longitudinal recording direction in the case of tape-like recording media on the one hand and the use of disk-shaped magnetic recording media in which the information is recorded in concentric circular tracks on the other hand, there has been no lack of attempts to avoid the preferred direction of magnetization being in the coating direction, said preferred direction occurring in the conventional coating methods employing dispersions containing magnetic particles as a result of the flow of said dispersions and being troublesome in spite of being only a slight effect.

For example, U.S. Pat. No. 4,208,447 describes a process in which a sequence of magnetic fields of different field directions and decreasing field strength acts on the coated substrate in the running direction of the latter. DE-A 3347460 describes a similar procedure. However, the disadvantage of these processes is that their effect is dependent on the particular nature of the dispersion and on the magnetic parameters of the magnetic material, the layer thickness and the speed of the coated tape. The same also applies to the arrangement disclosed in DE-A 36 00 076, in which magnets of changing polarity are mounted inclined to the running direction. To solve this problem, U.S. Pat. No. 4,791,032 describes the use of an alternating field which is dependent on the coercive force of the magnetic material and has a frequency dependent on the speed of the coated web. In this case too, the influence of the dispersion properties has not been sufficiently taken into account and may necessitate modification of the apparatus. Other attempts at solving the problem are known, for example the formation of narrow, strip-like zones with an orientation forming different angles of from 60° to 120° C., as described in DE-A 27 48 215, or the deorientation of magnetic particles by a rotating disk having a planar arrangement of magnets of alternating field direction, as described in U.S. Pat. No. 4,518,627, but these are in no way satisfactory. For example, they are either insufficiently sensitive in the case of disk-shaped recording media, in particular for high density information storage, or they require very large rotating disks or permit only small coating widths.

It is an object of the present invention to provide a process for the production of magnetic recording media having stochastic orientation of the magnetically anisotropic particles, which process does not have the above-mentioned disadvantages and in particular can be simply and rapidly adapted to the various process parameters with regard to the dispersion and coating mode used.

We have found that this object is achieved by a process for the production of magnetic recording media having stochastic orientation of the magnetically anisotropic particles in the magnetic layer by applying a layer of a dispersion consisting essentially of the magnetic particles finely divided in a solution of an organic binder system to a flexible substrate, deorienting the magnetically anisotropic particles in the layer by means of an arrangement provided with magnets having different polarities and having a field strength decreasing in the direction of movement of the magnetic layer, and subsequently solidifying the magnetizable layer, if the magnetic field of a rotating magnetic drum having a number of radially arranged magnets of alternating polarities which essentially covers the lateral surface of the magnetic drum acts on the dispersion layer.

The present invention furthermore relates to an apparatus for carrying out the novel process. This apparatus for the stochastic orientation of the magnetically anisotropic particles in the dispersion applied as a layer consists of a rotatably arranged drum which extends over the entire width of the coated substrate and consists of an axle, an inner cylindrical part of magnetically soft material and a hollow cylinder located directly on top of this, consisting of nonmagnetic material and having a number of radially arranged orifices, usually drilled holes which essentially covers the lateral surface of the hollow cylinder, in which drilled holes magnets are arranged alternately in a manner such that the magnetic field emerges at right angles from the lateral surface of the outer cylinder.

In a further embodiment of the novel apparatus, both the rotary movement of the rotating cylinder and the distance of the cylinder from the planar substrate moving along under the rotating cylinder and coated with the dispersion can be controlled independently of one another or each alone or together as a function of a parameter defining the stochastic orientation of the magnetic particles.

If the magnetically anisotropic particles in the magnetic layer are stochastically oriented, the magnetic recording material can particularly advantageously be used for the production of magnetic recording disks, i.e. floppy disks, which are not adversely affected by modulation which occurs in the case of magnetic disks produced from magnetic material whose magnetic particles are oriented in a transport direction.

Further advantages, details and features of the novel process and of the apparatus are evident from the following description of a preferred embodiment of the invention and from the drawings.

DETAILED DESCRIPTION OF THE DRAWINGS

A nonmagnetic, web-like flexible substrate 1 which moves continuously in direction A is uniformly provided with a dispersion layer 2 which contains the magnetically anisotropic particles finely divided in an organic binder system. Although the magnetic particles exhibit a substantial degree of disorder in the dispersion layer, since they are generally acicular, slight longitudinal orientation occurs in the direction of flow during application of the dispersion itself. The dispersion layer is therefore subjected to the action of an apparatus 3 which serves for stochastic orientation and is arranged at a distance 9 above the dispersion layer. The dispersion layer is subsequently solidified to give the magnetic layer by drying, i.e. evaporation of the solvent and/or crosslinking of the binder component.

Figure 3:
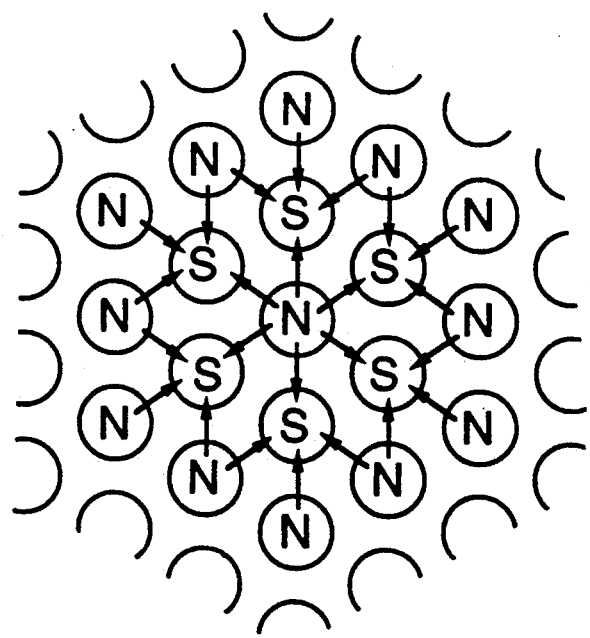
FIG. 3 shows an example of the magnetic field pattern.

The apparatus 3 used for stochastic orientation consists of an axle 4 provided with a controllable drive, an inner cylindrical part 5 of magnetically soft material, in general soft iron, and a hollow cylinder 6 which is arranged on top of this, consists of nonmagnetic material and has a large number of radially arranged orifices, usually drilled holes 7. The number of drilled holes covering the lateral surface of the cylinder 6 is chosen so that the rod-like permanent magnets inserted in these holes cover a very large part of the lateral surface. The permanent magnets can be fixed either by adhesive bonding or, for example, by covering the cylinder 6 with a very thin nonmagnetic cover 8. The permanent magnets used should have a very high $(BH)_{max}$ value; for example, magnets of the rare earth/cobalt, Alnico or hexagonal ferrite, such as barium ferrite, type can be used, hexagonal ferrites being preferred. The arrangement of the permanent magnets with regard to their polarity must be such that as many magnetic field changes as possible occur. Patterns such as a hexagonal arrangement of the permanent magnets have proven advantageous here. FIG. 3 shows, by way of example, a projection of a part of the lateral surface. Owing to the arrangement of the magnets, each point of the dispersion layer is exposed to a magnetic field whose direction and intensity varies with time and which prevents the individual magnetic particles from adopting a preferred direction.

In this connection, it is advantageous to design the fastening of the permanent magnets with the aid of the cover 8 in a variable manner so that the stated pattern can be easily changed.

Figure 1:
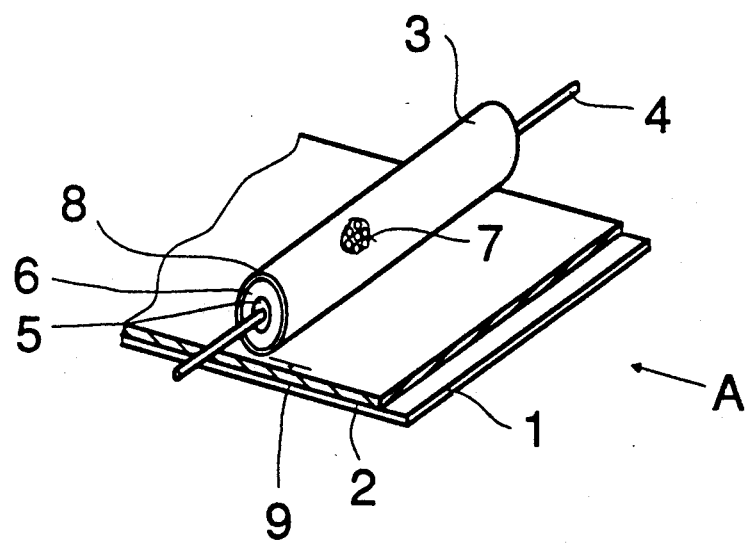
FIG. 1 shows a schematic representation of an arrangement and apparatus for the stochastic orientation according to the present invention.
Figure 2:
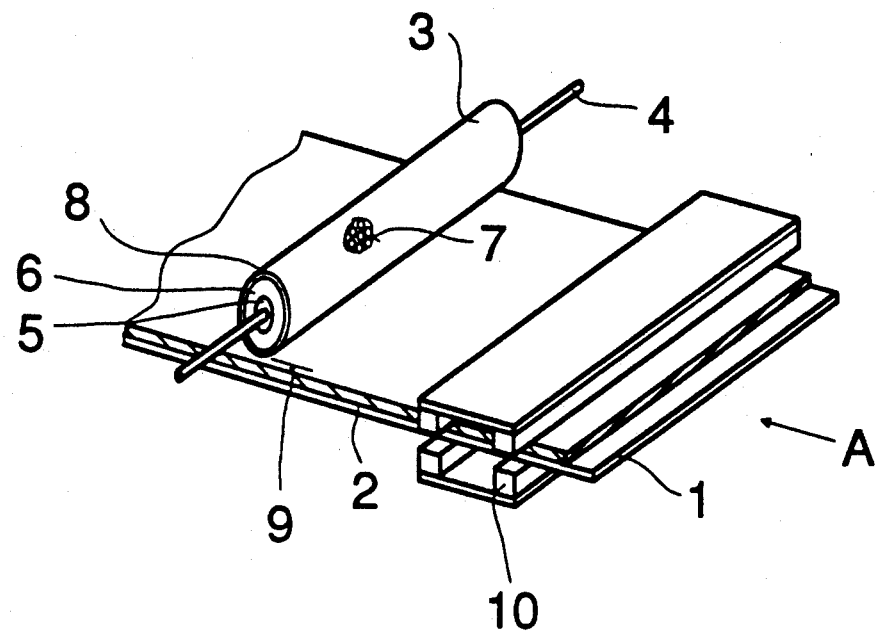
FIG. 2 shows a schematic representation of an advantageous embodiment of the novel process.

In an advantageous embodiment of the novel process, the magnetic particles in the dispersion are first substantially uniformly oriented before deorientation with the aid of the novel apparatus. FIG. 2 shows such a procedure by way of example. Here, the particles are oriented in the plane along the direction of movement A with the aid of a stationary magnetic arrangement 10, by a magnetic field running in the plane of the dispersion layer. The magnetic arrangement 10 can similarly also be designed so that the direction of the magnetic field and hence the orientation of the particles are vertical to the plane of the direction of movement A.

The composition and the preparation of the dispersions suitable for the production of magnetic recording media is part of the general prior art. The magnetic materials used are known. They are preferably acicular magnetic iron oxides of different compositions, in particular with the addition of cobalt as a dopant, ferromagnetic chromium dioxide containing the usual modifying elements or very small acicular ferromagnetic metal particles, generally based on iron and/or nickel.

Dispersions of this type can be used for the novel process. The particular advantage of the novel process is that it enables widely differing dispersions to be used in a simple manner.

This is possible in particular if the novel apparatus is incorporated in a simple control loop. If, after deorientation of the magnetic particles in the dispersion, the stochastic orientation is measured, preferably by a non-contact method, after solidification of the dispersion, this measurement can be used for optimally adjusting both the circumferential speed of the magnetic drum 3 and the distance 9 from the drum to the dispersion layer 2.

The stochastic orientation, permitted by the novel process, of the magnetic particles in the magnetic layer is particularly evident when magnetic disks, i.e. floppy disks, are subsequently punched from the web-like magnetic recording medium. In such disks, magnetic recording is performed in concentric circular tracks. If the magnetic layer in this case were to have a preferred magnetic direction, even to only a slight extent, troublesome modulation of the output signal would result during recording on a disk. This is excluded when the novel process is used. Thus, a modulation of less than 3% is achievable for a metal pigment floppy disk, whereas a modulation of 13% is measured without the use of the novel process.

We claim:

1. A process for the production of a magnetic recording medium having stochastic orientation which comprises
   apply a layer of a dispersion consisting essentially of anisotropic magnetic particles in a solution of an organic binder system to a flexible substrate,
   randomizing the magnetic orientation of the magnetically anisotropic particles in the said layer by means of a disorienting magnetic field created by a drum rotating above the said applied layer of dispersion, the drum having magnets arranged on the peripheral surface thereof in such a manner that the N poles and S poles exhibit a hexagonal arrangement of alternating polarities, and
   subsequently solidifying the said layer.

2. A process as claimed in claim 1, wherein the magnetic particles in the dispersion layer are oriented in a uniformly unidirectional field before being subjected to stochastic orientation.

3. A process as claimed in claim 1, wherein the rotary speed of the magnetic drum is controlled by a measuring means determining the stochastic orientation of the magnetic particles.

4. A process as claimed in claim 1, wherein the distance of the magnetic drum from the dispersion layer is controlled by a measuring means determining the stochastic orientation of the magnetic particles.

* * * * *